United States Patent [19]

Dissett

[11] Patent Number: 4,751,853
[45] Date of Patent: Jun. 21, 1988

[54] DIFFERENTIAL WITH EQUAL DEPTH PINION CAVITIES

[75] Inventor: Walter L. Dissett, Southfield, Mich.
[73] Assignee: Tractech, Inc., Warren, Mich.
[21] Appl. No.: 906,844
[22] Filed: Sep. 12, 1986

Related U.S. Application Data

[63] Continuation-in-part of Ser. No. 689,929, Jan. 9, 1985, Pat. No. 4,625,585.

[51] Int. Cl.$^4$ .......................... F16H 3/28; F16H 57/02
[52] U.S. Cl. ........................................ 74/715; 74/607
[58] Field of Search .............. 74/715, 714, 607, 606 R

[56] References Cited

U.S. PATENT DOCUMENTS

| | | | |
|---|---|---|---|
| 1,195,314 | 8/1916 | Williams | 74/715 |
| 1,941,645 | 1/1934 | Walter | 74/715 |
| 2,000,223 | 5/1935 | Du Pras | 74/715 |
| 2,178,613 | 11/1939 | Seeck | 74/715 |
| 2,462,000 | 2/1949 | Randall | 74/715 X |
| 2,550,750 | 5/1951 | Abelt | 74/715 X |
| 2,788,679 | 4/1957 | Mott | 74/714 |
| 2,900,846 | 8/1959 | Lehman | 74/715 X |
| 2,972,265 | 2/1961 | Walter | 74/715 X |
| 3,095,761 | 7/1963 | Hilado | 74/715 |
| 3,706,239 | 12/1972 | Myers | 74/715 |
| 4,365,524 | 12/1982 | Dissett et al. | 74/715 |
| 4,512,211 | 4/1985 | Stritzel | 74/715 |
| 4,625,585 | 12/1986 | Dissett | 74/715 |

FOREIGN PATENT DOCUMENTS 130806 1/1985 European Pat. Off. .............. 74/715

Primary Examiner—Leslie A. Braun
Assistant Examiner—Dwight G. Diehl
Attorney, Agent, or Firm—Laubscher & Laubscher

[57] ABSTRACT

A torque-proportioning differential of the helical pinion type includes a housing having a body section to one end of which is removably connected a cover section, the one body section end being machined to define a central longitudinal bore and a plurality of circumferentially spaced longitudinal pinion cavities each having a pair of cavity portions in longitudinal communication with each other and with the central bore, respectively. The pinion cavity portions are of equal depth, thereby to receive corresponding longitudinally offset helical pinions, respectively, each provided with a hub extension that extends longitudinally of the associated pinion bore for engagement with a corresponding end thrust surface on the housing body section or the housing cover section, respectively.

2 Claims, 5 Drawing Sheets

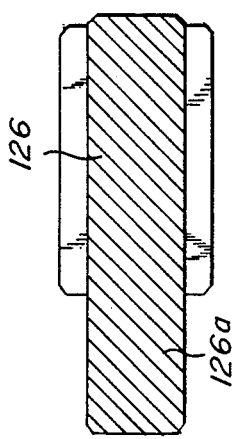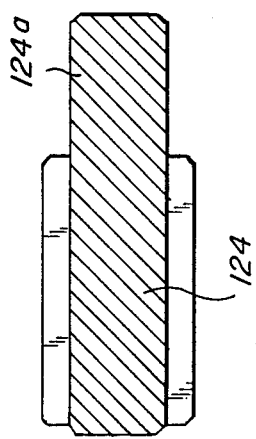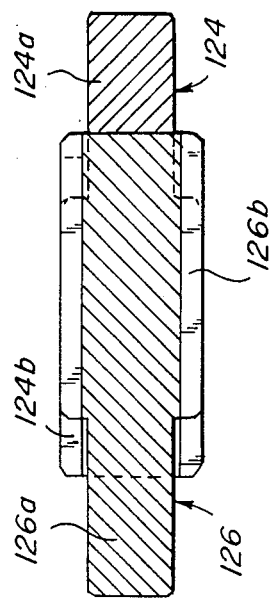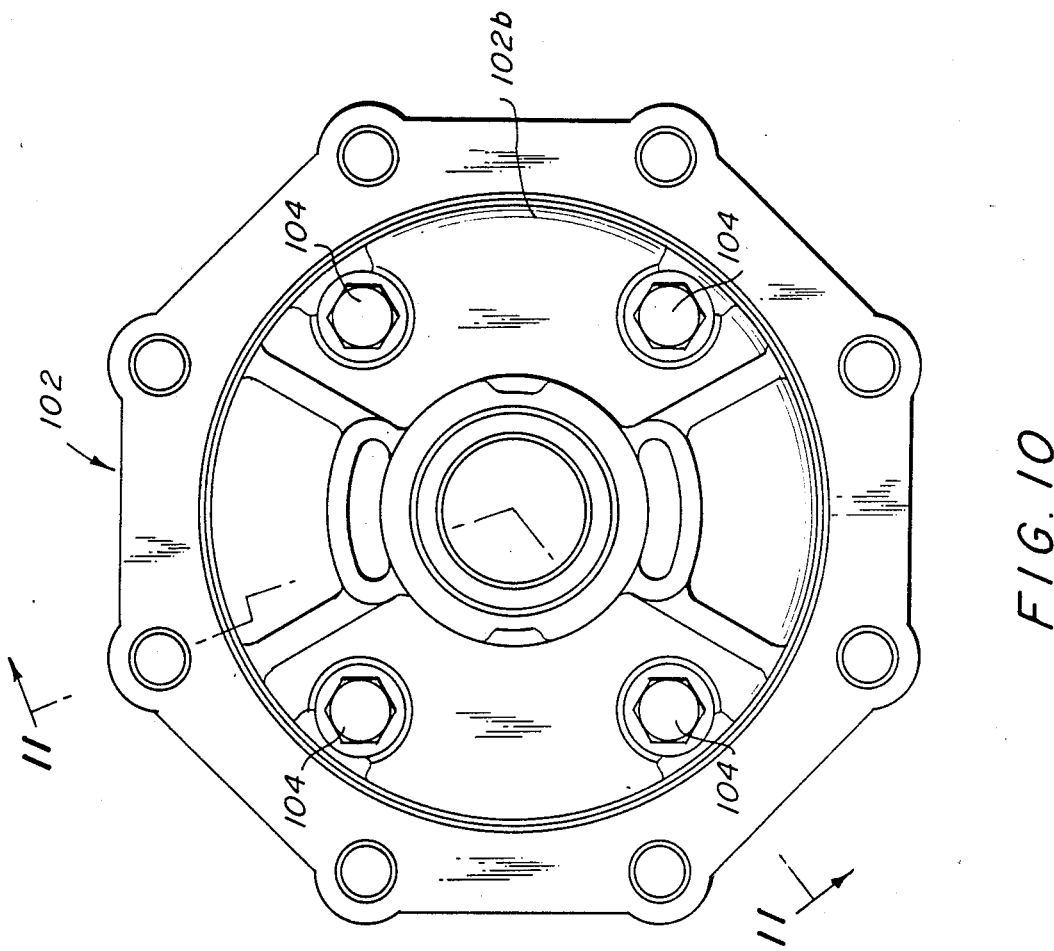

`4,751,853`

DIFFERENTIAL WITH EQUAL DEPTH PINION CAVITIES

REFERENCE TO RELATED APPLICATION

This is a continuation-in-part application to the inventor's prior U.S. application Ser. No. 689,929 filed Jan. 9, 1985, entitled "Improved Torque-Proportioning Differential With Sectional Housing", which issued as U.S. Pat. No. 4,625,585 on Dec. 2, 1986.

BRIEF DESCRIPTION OF THE PRIOR ART

Torque-proportioning differentials of the helical gear type having an inherent friction torque bias are well known in the art, as evidenced, for example, by the prior patents to Myers U.S. Pat. No. 3,706,239 and Dissett et al U.S. Pat. No. 4,365,524, each assigned to the same assignee as the present invention.

As disclosed in the aforementioned Myers patent, the torque delivery gear elements of a helical gear differential may be designed to develop an inherent friction torque bias as relative motion occurs owing to the differentiating action of the mechanism. A plurality of discrete pairs of pinion cavities are provided in the housing in circumferentially spaced relation about, and in communication with, the central chamber in the opposite ends of which are mounted the helical side gears. Mounted with an outside diameter running fit in the pinion cavities are a pair of longitudinally offset helical pinions which are in enmeshing engagement at their adjacent ends, the remote ends of the pinions being in enmeshing engagement with the side gears that are internally splined to, and are concentrically mounted on, the output shafts, respectively. The transverse forces caused by the gear tooth loadings of the pinions cause an inherent frictional resistance at the outside diameter fit, thus introducing an inherent torque bias. The magnitude of the bias torque is proportional to the transverse gear tooth loading, which in turn is proportional to the torque transmitted through the differential assembly. The helix angle of the gears introduces an axial thrust on the respective differential pinions causing a frictional drag owing to the frictional engagement of the axial ends of the pinions with the bases of the pinion cavities of the differential carrier housing.

The friction due to the reaction forces on the housing at the axial ends of the meshing pinions is created by the thrust forces of the helix angle of the gears. These friction forces on the housing complement the friction forces created by reason of the sliding contact of the addendum surfaces of the pinions on the circular walls of the pinion cavities. Because of the disposition of the pinion cavities in discrete pairs, the housing more completely surrounds the pinions than would be the case if the pinions were not located in discrete pairs. The friction forces can be varied by altering the diameter of the pinions, their circular pitch or their helix angles, thereby providing paramters that can be varied to suit several particular design requirements. Also, the numbers of pair of pinions may be varied to provide a different bias torque and torque capacity.

As described in the aforementioned Myers patent, the tooth forces acting on the meshing pinions also have a radial component due to the pressure angle of the pinion teeth. This tends to cause the individual pinions to become misaligned or cocked with respect to each other. The presence of the axial gear tooth forces due to the helix angle induces also a cocking couple which tends to increase the cocking force couple caused by the radial force component in the case of one pinion as it is reduced in the case of the other. The force couples induced by the helix angle are in addition to the end thrust forces on the housing and the reaction thrust forces on the side gears. The forces on the side gears cause a force imbalance due to the presence of friction in the pinion meshes and the presence of friction between the housing and the pinions. This results in a primary force on one side gear that is different than the reaction force on the opposite side gear. The transverse forces at the point of mesh of the pinions of each pair which are distributed to the surrounding housing wall are greater than the corresponding transverse forces that would exist at the pinion mesh points of prior art differential gear arrangements where a full circle of pinions is used. The transverse loads at the pinion mesh points in such prior art arrangements tend to cancel each other.

In the aforementioned parent application Ser. No. 689,929 (now U.S. Pat. No. 4,625,585), the housing consists of a body section, and an end cover section, the body section containing at one end a plurality of discrete pairs of longitudinal pinion cavities circumferentially spaced about a central longitudinal bore, the pinion cavities of each pair being of unequal depth. One drawback to this construction is that two different types of helical pinions are required, one including a hub extension to properly position the pinion in the deeper of the pinion cavities, and the other being of conventional construction without the provision of a hub extension with the length of the pinion corresponding with the depth of the shorter of the pinion cavities.

The present invention was developed as an improvement over these known differential mechanisms, whereby the manufacturing costs would be reduced, and the machining accuracies would be increased.

SUMMARY OF THE INVENTION

Accordingly, a primary object of the present invention is to provide an improved differential of the torque-proportioning helical gear type in which the housing includes a body member to one end of which is removably connected a cover member, said one end of the body member containing a plurality of discrete pairs of longitudinal pinion cavities of equal depth circumferentially spaced about a central longitudinal bore. The cover section is preferably piloted to the body section, thereby to assist the assembly and mutual alignment of the various differential components.

In accordance with a more specific object of the invention, means are provided for maintaining the remote ends of the associated longitudinally offset helical pinions adjacent end thrust surfaces on the body and cover section, respectively. To this end, the pinion mounted in a first cavity is provided with a hub extension that extends axially for engagement at its free end with an end thrust surface on the cover section. The associated helical pinion includes at one end a similar hub extension that extends longitudinally of the pinion bore for engagement with an end thrust surface on the body member at the bottom of the pinion bore, whereby the end face at the other end of this pinion is maintained adjacent an end thrust surface on the cover section.

According to another feature of the invention, the differential housing is formed from nodular iron, thereby to improve machinability and reduce heat treatment distortion. To improve the strength and to reduce wear from the internal rotating components, the housing can be hardened by suitable heat treatment. Alternatively, the housing can be formed from carburized and hardened steel. The side gear chamber and the pinion cavities preferably are machined in one set up, thereby reducing machine error between related pinion cavities. The side gear cavity is formed in a single pass. Owing to the provision of the hardened thrust surfaces on the housing and the cover, the necessity of separate thrust washers is eliminated. Thrust washer removal provides increase piloting of the side gear to the body member and cover. The simplified design of the differential reduces manufacturing problems without adversely affecting performance. The necessity for machining the unit after final assembly is avoided, thereby reducing the possibility of metal chips contaminating the internal function of the unit.

The present invention offers the advantage that both sets of helical pinions are of the same type and length (i.e., both sets are provided with hub extensions), whereby the pinions may be machined from uniform blanks, the hub extensions serving as grippers chucked onto a hub for machining of the left hand and right hand helical teeth, respectively. Moreover, during machining of the pinion bores in one end of the housing body, since all of the pinion bores are of equal depth, it is not necessary to regulate the cutting depths for unequal length, thereby affording better tolerance. Furthermore, the heat treatment with induction hardening is improved since a common induction coil may be used with each pinion bore. Other common methods of heat treating the case can be used, such as austempering, carburizing and hardening, and flame hardening.

BRIEF DESCRIPTION OF THE DRAWING

Other objects and advantages of the invention will become apparent from a study of the following specification, when viewed in the light of the accompanying drawing, in which:

FIGS. 8 and 9 are longitudinal section and end elevational views, respectively, of the side gears of the apparatus of FIG. 1;

FIG. 10 is an end view of the torque proportioning helical pinion differential of the present invention;

FIGS. 13 and 14 are sectional views of the helical pinions of FIG. 11; and

FIG. 15 is a detailed view of a pair of cooperating helical pinions axially displaced for purpose of illustration.

DETAILED DESCRIPTION

Figure 1:
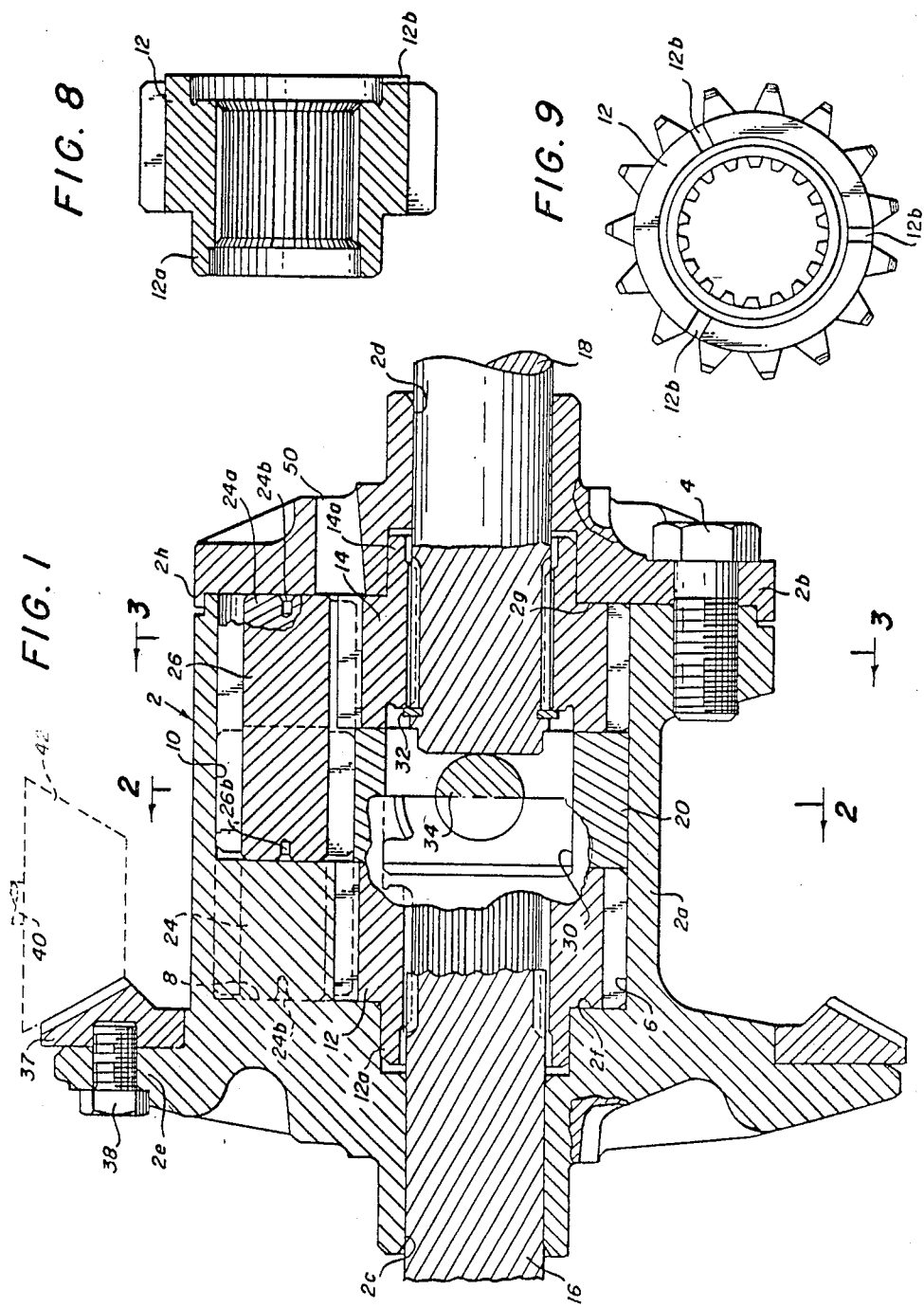
FIG. 1 is a central longitudinal sectional view of the torque proportioning helical pinion differential of the aforementioned U.S. Pat. No. 4,625,585.
Figure 2:
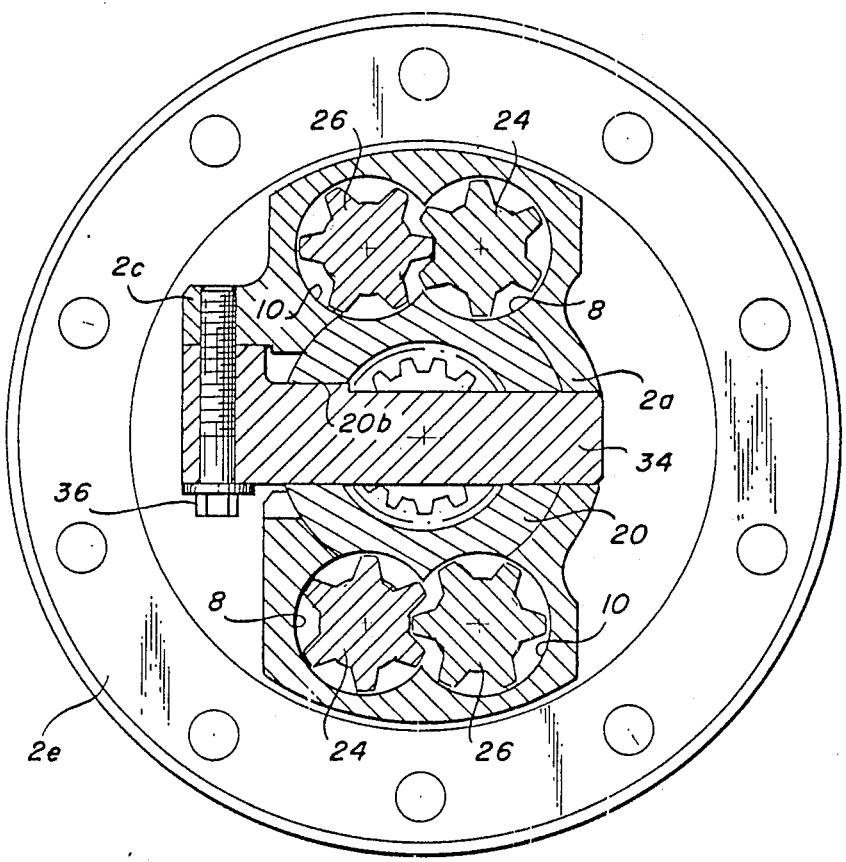
FIGS. 2 and 3 are sectional views taken along lines 2—2 and 3—3, respectively, of FIG. 1.
Figure 4:
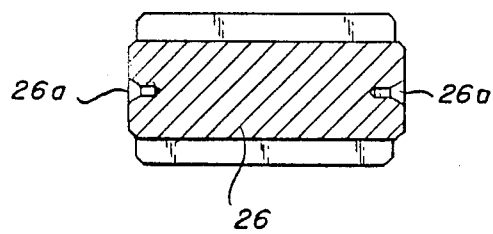
FIGS. 4 and 5 are longitudinal sectional views of the two types of helical pinion gears that are used in the embodiment of FIG. 1.
Figure 5:
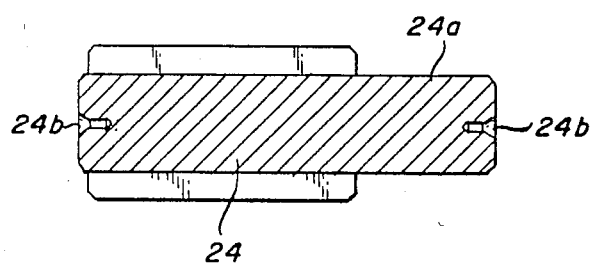
Figure 3:
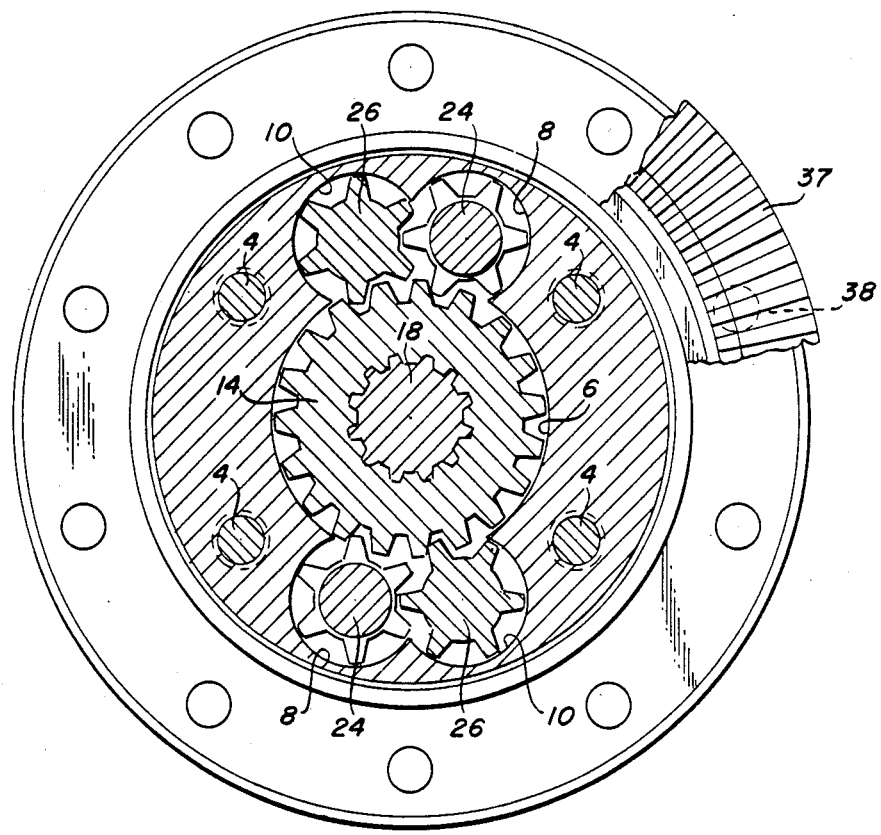

Referring first more particularly to FIG. 1, the differential apparatus of the prior invention of application Ser. No. 689,929 (now U.S. Pat. No. 4,625,585) includes a sectional housing 2 including a body section 2a to one end of which is removably connected a piloted cover section 2b by bolts 4. The said one end of the body section contains a longitudinal central bore 6, and a plurality of circumferentially spaced pairs of longitudinal pinion cavities 8 and 10 that are in communication with each other and with the central bore 6. Arranged at each end of the chamber defined by central bore 6 are a pair of helical side gears 12 and 14 the remote ends of which include axial hub extensions 12 and 14a that are journalled in corresponding bores contained in the body and cover sections, respectively. The body and cover sections contain on the longitudinal axis of the housing aligned outlet shaft openings 2c and 2d that receive the adjacent ends of a pair of aligned axially spaced output shafts 16 and 18 to which the side gears 12 and 14 are splined, respectively.

Figure 6:
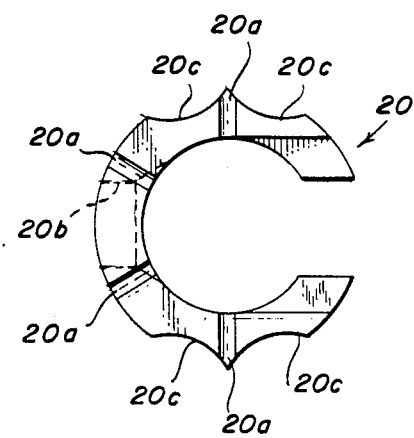
FIGS. 6 and 7 are end and side elevation views, respectively, of the side gear spacer means.
Figure 7:
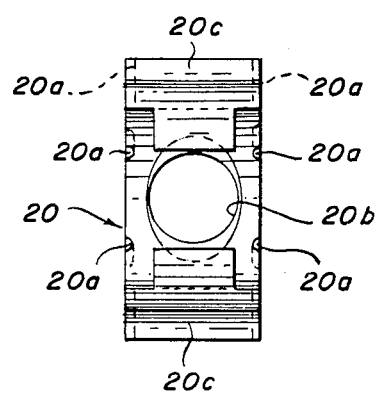
Figure 12:
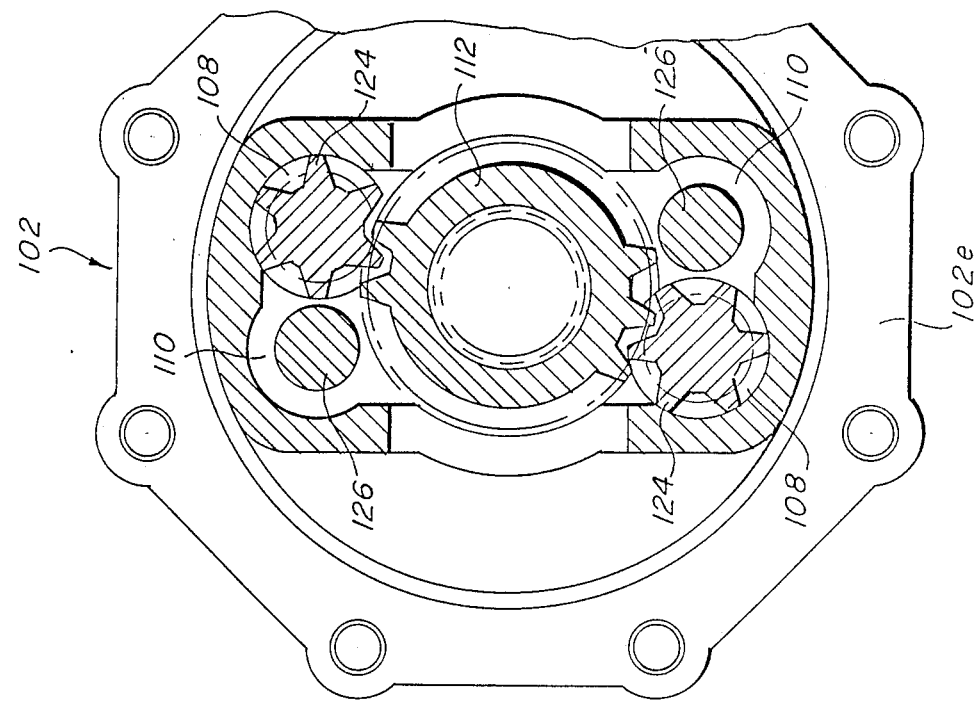
FIG. 12 is a sectional view taken along line 12—12 of FIG. 11.
Figure 11:
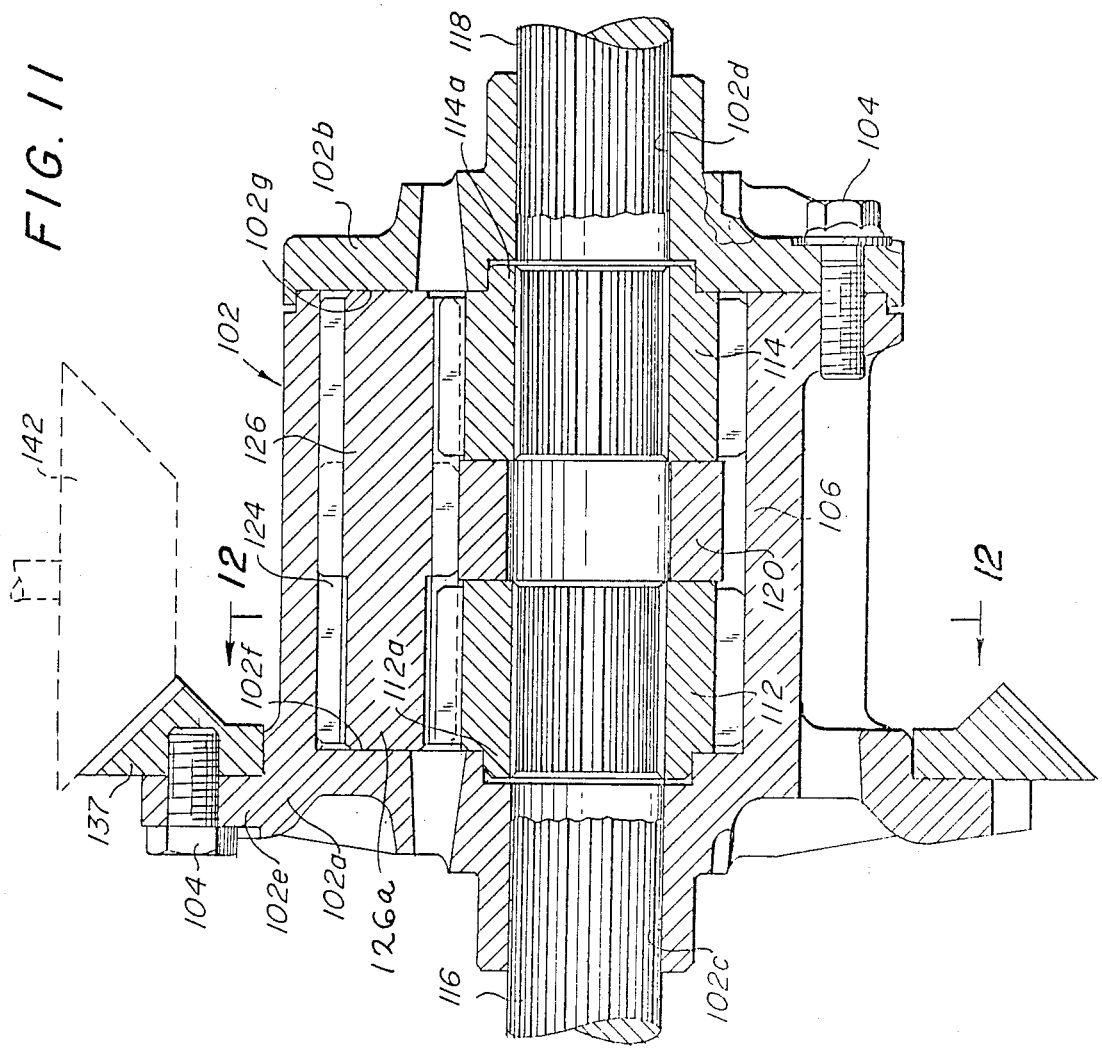
FIG. 11 is a sectional view taken along line 11—11 of FIG. 10.

Arranged coaxially in contiguous engagement between the adjacent ends of the side gears 12 and 14 is a generally annular side gear spacer 20. As shown in FIGS. 6 and 7, the side gear spacer is of generally C-shaped configuration and has at each end flat thrust bearing surfaces containing a plurality of spaced radially extending oil distribution grooves 20a. The corresponding faces of the side gears may contain similar radially extending oil distribution grooves, as shown by the grooves 12b of FIG. 9. Intermediate its ends the gear spacer contains a radially extending through bore 20b for receiving an output shaft spacer element, as will be described below.

Mounted in longitudinally spaced relation with an outside diameter running fit within each pair of pinion cavities 8 and 10 are helical pinions 24 and 26, respectively. These pinions, which have right and left hand helix angles, respectively, are in enmeshing engagement at their adjacent ends and at their remote ends, the pinions are in enmeshing engagement with the helical side gears 12 and 14 having corresponding left and right helix angles, respectively. As shown in FIG. 1, the cavities 8 containing the pinions 24 have a greater depth than the cavities 10 containing the pinions 26. The depth of each cavity 10 corresponds with the length of each corresponding pinion 26, whereupn the right hand end surface of each pinion 26 (as shown in FIG. 1) is positioned adjacent a corresponding thrust bearing surface on the cover section 2b. In order to maintain the pinions 24 in positions in which their left hand end surfaces are adjacent the corresponding end thrust surfaces on the body section 2a, the pinions 24 are provided on their right hand ends with integral hub extensions 24a that extend longitudinally of the pinion cavities 8 for engagement at their free ends with corresponding end thrust surfaces on the cover section 2b. At each end, the helical pinions 26 may be provided with oil receiving recesses 26a, and the left hand end surface of the pinion 24 and the end surface of the pinion hub extension 24a may be provided with oil receiving recesses 24b.

Referring again to FIG. 1, the housing body section 2a contains intermediate its ends an access window 30 which affords access for securing a C-shaped locking device to the end of each output shaft within the housing, thereby to prevent outward movement of the output shafts relative to their respective side gears. In order to maintain the adjacent ends of the output shafts in axially spaced relation, a cylindrical spacer member 34 is introduced between the adjacent output shaft ends via the access window 30 and the radial opening 20b contained in the gear spacer member 20, which spacer member is bolted by bolt 36 to an integral lateral extension 2c of the body section, thereby to prevent rotation of the spacer member 20 relative to the housing 2. The gear spacer member 20 is provided on its outer periphery with longitudinal pairs of circumferentially spaced grooves 20c that support the the adjacent enmeshing end portions of the pinions 24 and 26.

At its other end, the housing body section 2a is provided with an external annular flange portion 2e to which ring gear 37 is connected by bolts 38, which ring gear is driven from drive shaft 40 via driving pinion 42, thereby to rotatably drive the housing about its longitudinal axis.

OPERATION

Assuming that the housing is rotatably driven from drive shaft 40 via pinion 42 and ring gear 36, driving torque is supplied to the outputs shafts 16 and 18 via the two parallel torque delivery paths that include the enmeshing helical pinions 24 and 26 and the side gears 12 and 14, respectively. This introduces radial gear tooth loading on the pinions, which results in frictional resistance due to rotation, thus causing an inherent bias torque. Because of the helix angle on the pinions 24 and on the companion side gears, a thrust force is produced on the pinions causing frictional resistance owing to the engagement of the pinions with the ends of their respective pinion cavities. A thrust force is introduced also on the spacer element owing to the axial gear tooth loading on the two side gears. In the reverse direction, another thrust force is produced owing to the axial gear tooth loads transmitted to shoulders 2f and 2g on the housing sections 2a and 2b, respectively.

When the differential mechanism is transmitting torque with the vehicle moving in a straight driving path, no differential motion exists in the gearing. There then is no bias torque except in those instances when the vehicle undergoes turning maneuvers or when one reaction wheel loses traction and a spin-out condition tends to occur. But since such conditions are transient, there is no opportunity for a prolonged frictional horsepower loss to occur. Overheating and oil film breakdown should not occur.

Suitable lubrication oil for providing a normal lubrication oil film can be introduced into the pinion and gear cavities through oil port 50 of cover section 2b, as shown in FIG. 1, and a similar oil port (not shown) at the flange end of the body. Lubrication oil normally present in the differential housing is admitted through these ports to the interior of the carrier housing.

The present invention offers many desirable advantages. For example, the formation of the housing as a casing having the integral flange portion 2e strengthens the overall unit. Moreover, the body section is more easily and accurately produced, since the machining of the longitudinal center bore and the pinion cavities can occur in one step, thereby assuring precise boring with parallel axes. By eliminating final machining after final assembly, the possibility of metal chips contaminating the internal function of the unit is avoided. By hardening of the thrust supporting surfaces on the housing surfaces, the necessity of the provision of thrust washers is eliminated. Finally, owing to the piloting of the cover section 2b on the body section by the outer concentric flange portion 2h of the cover member, accurate alignment of the sections is assured, thereby increasing the ease of assembly of the differential components.

Referring now to the present invention as illustrated in FIGS. 10-15, the differential includes a sectional housing 102 including a body section 102a to one end of which is removably connected a piloted cover section 102b by bolts 104. The said one end of the body section contains a longitudinal central bore 106, and a plurality of circumferentially spaced longitudinal pinion cavities containing pinion cavity portions 108 and 110 that are in communication with each other and with the central bore 106. Arranged at each end of the chamber defined by central bore 6 are a pair of helical side gears 112 and 114 the remote ends of which include axial hub extensions 112a and 114a that are journalled in corresponding bores contained in the body and cover sections, respectively. The body and cover sections contain on the longitudinal axis of the housing aligned outlet shaft openings 102c and 102d that receive the adjacent ends of a pair of aligned axially spaced output shafts 116 and 118 to which the side gears 112 and 114 are splined, respectively.

Arranged coaxially in contiguous engagement between the adjacent ends of the side gears 112 and 114 is a generally annular side gear spacer 120.

Mounted in longitudinally spaced relation with an outside diameter running fit within each pair of pinion cavities cavity portions 108 and 110 are helical pinions 124 and 126, respectively. These pinions, which have right and left hand helix angles, respectively, are provided with helical teeth 124b, 126b, respectively, which are in enmeshing engagement at their adjacent ends, and at their remote ends, the pinions are in enmeshing engagement with the helical side gears 112 and 114 having corresponding left and right helix angles, respectively. As distinguished from the prior apparatus of FIG. 1, the cavity portions 108 containing the pinions 125 have the same depth as the cavity portions 110 containing the pinions 126. In order to maintain the pinions 24 in positions in which their left end surfaces are adjacent the corresponding end thrust surfaces on the body section 102a, the pinions are provided on their right hand ends with integral hub extensions 124a that extend longitudinally of the pinion cavity portions 108 for engagement at their free ends with corresponding end thrust surfaces 102g on the cover section 102b. Similarly, the helical pinions 126 are provided at their left hand ends with integral hub extensions that extend longitudinally of the pinion cavities 110 for engagement at their free ends with corresponding end thrust surfaces 102f on the body section 102a.

The operation of the embodiment of FIGS. 10-15 is identical to that of the prior embodiment of FIGS. 1-9.

What is claimed is:

1. A differential mechanism of the torque-proportioning helical pinion type having inherent friction torque bias, comprising:
  (a) a two-part sectional housing adapted to be rotatably driven about its longitudinal axis, said housing consisting of:
    (1) a body section (102a) containing at one end:
      (a) a longitudinal central bore (106) defining a central chamber; and
      (b) a plurality of pinion cavities extending longitudinally from said body section one end and being arranged in circumferentially spaced relation about said central bore, the cavities being of equal depth and each having pinon cavity portions (108, 110) in communication with each other and with said central bore; and (2) a single end cover section (102b) connected with said one end of said body section for closing the ends of said central bore and said pinion cavities;

(3) said body and end sections containing outlet shaft openings coaxially arranged relative to the longitudinal axis of said housing and in communication with said central chamber, respectively;

(b) a pair of longitudinally spaced helical side gears (112,114) journalled at opposite ends of said central chamber coaxially with the longitudinal axis of said housing, said side gears being adapted to be splined to the adjacent ends of a pair of aligned axially spaced output shafts extending through said housing openings, respectively, said side gears having at their remote ends end thrust surfaces adapted for cooperation with corresponding thrust surfaces on said body and cover members, respectively;

(c) generally annular side gear spacer means (120) arranged coaxially between said side gears, said spacer means and said side gears having at their adjacent ends cooperating end thrust surfaces;

(d) pairs of helical pinions (124, 126) journalled with an outside diameter running fit in longitudinally offset relation in said pinion cavity portions, respectively, the pinions of each pair being in meshing engagement with each other at their adjacent ends, the remote ends of said pinion pair being in meshing engagement with the associated side gears, respectively; and (e) hub extension means (124a, 126a) on each of said pinions extending longitudinally in opposite directions of said pinion bores for supporting the pinions of each pair adjacent the remote ends of the pinion cavity portions of that pair, respectively, the remote ends of said pinions having thrust surfaces adapted for cooperation with corresponding thrust surfaces on said body and cover sections, respectively.

2. Apparatus as defined in claim 1, wherein the extremities of the hub extensions of each pinion pair engage corresponding thrust surfaces on said cover and said body sections, respectively.

* * * * *